United States Patent
Wong (10) Patent No.: US 7,130,773 B1
(45) Date of Patent: Oct. 31, 2006

(54) METHOD AND APPARATUS FOR PROCESSING DATA USING OBJECTS

(75) Inventor: Hinkmond B. Wong, Sunnyvale, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 57 days.

(21) Appl. No.: 11/000,575

(22) Filed: Nov. 30, 2004

(51) Int. Cl.
*G06F 15/00* (2006.01)

(52) U.S. Cl. .................. 702/189; 340/539.1; 370/328; 370/338; 709/217; 709/227; 717/108; 717/114; 717/116

(58) Field of Classification Search ...................... None
See application file for complete search history.

(56) References Cited

U.S. PATENT DOCUMENTS 6,925,471 B1 * 8/2005 Bodin et al. ........... 235/462.01
2003/0115288 A1 * 6/2003 Ljubicich et al. ........... 709/219
2003/0120607 A1 * 6/2003 Piotrowski .................... 705/64
2003/0216969 A1 * 11/2003 Bauer et al. .................. 705/22
2003/0227892 A1 * 12/2003 Cabana ....................... 370/338
2004/0085948 A1 * 5/2004 Cabana ....................... 370/352
2005/0033686 A1 * 2/2005 Peart et al. ................... 705/39
2005/0060233 A1 * 3/2005 Bonalle et al. ............... 705/16
2005/0071231 A1 * 3/2005 Beenau et al. ............... 705/16
2005/0101314 A1 * 5/2005 Levi ........................... 455/423
2005/0209947 A1 * 9/2005 Shafer ......................... 705/36
2005/0220055 A1 * 10/2005 Nelson et al. .............. 370/331
2006/0012473 A1 * 1/2006 Bishop et al. ........... 340/539.1

* cited by examiner

*Primary Examiner*—Carol S. W. Tsai
(74) *Attorney, Agent, or Firm*—Park, Vaughan & Fleming, LLP (57) ABSTRACT

One embodiment of the invention provides a method for processing actuator, sensor or radio frequency identification (RFID) tag data. The method includes receiving actuator, sensor or RFID tag data and generating a Java object associated with the actuator, sensor or RFID tag data. The Java object includes an assigned destination address. The method further includes forwarding the Java object to the assigned destination address.

35 Claims, 7 Drawing Sheets

METHOD AND APPARATUS FOR PROCESSING DATA USING OBJECTS

TECHNICAL FIELD

The present invention relates to the general field of objects defined within an object-oriented programming system. More specifically the invention relates to a method and apparatus for processing actuator, sensor or radio frequency identification tag data.

BACKGROUND

Computers are often used to gather and process data from RFID tags, actuators, or sensors. For example, RFID tags are used to uniquely identify products or items. RFID tag systems allow objects to be affixed with tags such than when the tag is within the electromagnetic field of a tag reader, the object can be identified by reading the tag that is attached to the object. In addition to identification data, the tag may contain other data about the object. The RFID tags can be encoded with user-defined data at time of use, pre-coded at the time of tag manufacture, or a combination of both. There are a great number of different RFID tag types, as well as different encoding, interrogation, and transmission protocols. RFID tags may be a single integrated circuit chip coupled to an antenna or may be a more complex device including sensors for temperature, position, or other desired features. Computers are used in conjunction with actuators and/or sensors to collect data in a variety of applications. For example, actuators and sensors are useful in such diverse applications as medical monitoring equipment, temperature monitoring equipment, weather monitoring electronics, location-based radio transmitters, and numerous other applications. In one example, actuators may serve as electronic components which can control machinery or electronics.

In the prior art, actuators, sensors, RFID tags, and devices employing actuators, sensors or RFID tags exist primarily on isolated and non-compatible individual networks. As described earlier, there are a wide variety of RFID tag, actuator, and sensor systems. Data collected from different and non-compatible networks using different protocols is difficult to collect, process, transmit, and analyze. This is particularly the case when trying to collect and analyze information from large numbers of remote points or when the collected data is to be transmitted via a network and processed at a network node other than the collection node. Thus, there is therefore a need for improved methods and apparatuses for collecting, processing, and sending data collected from actuators, sensors or RFID tags.

SUMMARY OF THE INVENTION

The present invention provides a solution to the needs described above through an inventive method and apparatus for collecting and processing data from actuators, sensors or RFID tags.

One embodiment of the invention provides a method for processing actuator, sensor or radio frequency identification (RFID) tag data. The method includes receiving actuator, sensor or RFID tag data and generating a Java object associated with the actuator, sensor or RFID tag data. The Java object includes an assigned destination address. The method further includes forwarding the Java object to the assigned destination address. In a further embodiment of the invention, the Java object is assigned a time to live value.

One embodiment of the invention provides a method for processing actuator, sensor or radio frequency identification tag data where actuator, sensor or RFID tag associated data encapsulated in a Java object is received. The Java object includes a time to live value and a destination address. The method includes decrementing the time to live value by an increment to generate a new time to live value and deleting the Java object if the new time to live value is equal to zero. The method further includes forwarding the RFID tag data to the destination address if the time to live value is not equal to zero.

DESCRIPTION OF THE DRAWINGS

The features and advantages of the apparatus and method of the present invention will be apparent from the following description in which.

DETAILED DESCRIPTION OF THE PREFERRED EMBODIMENTS

The present invention provides a solution to the needs described above through an inventive method and apparatus for processing actuator, sensor or radio frequency identification tag data.

Other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

The terms Java, Java Virtual Machine, and Java 2 Platform, Micro Edition are registered trademarks of Sun Microsystems, Inc., of Santa Clara, Calif.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

The present invention provides a method and apparatus for processing, managing, or sending data received from RFID tags, actuators, or sensors. Although the present description herein may describe data received from RFID tags, actuators, or sensors individually in certain instances for convenience or clarity, the invention may be utilized with data received from actuators, sensors, RFID tags, or all three: actuators, sensors and RFID tags. The present invention may also be utilized with data received from RFID tags incorporating actuators or sensors. In one aspect of the invention, data received from actuators, sensors or RFID tags is encapsulated into Java objects. The present invention may also be utilized with data received from other electronic devices or components in addition to RFID tags, actuators, and sensors.

Figure 1:
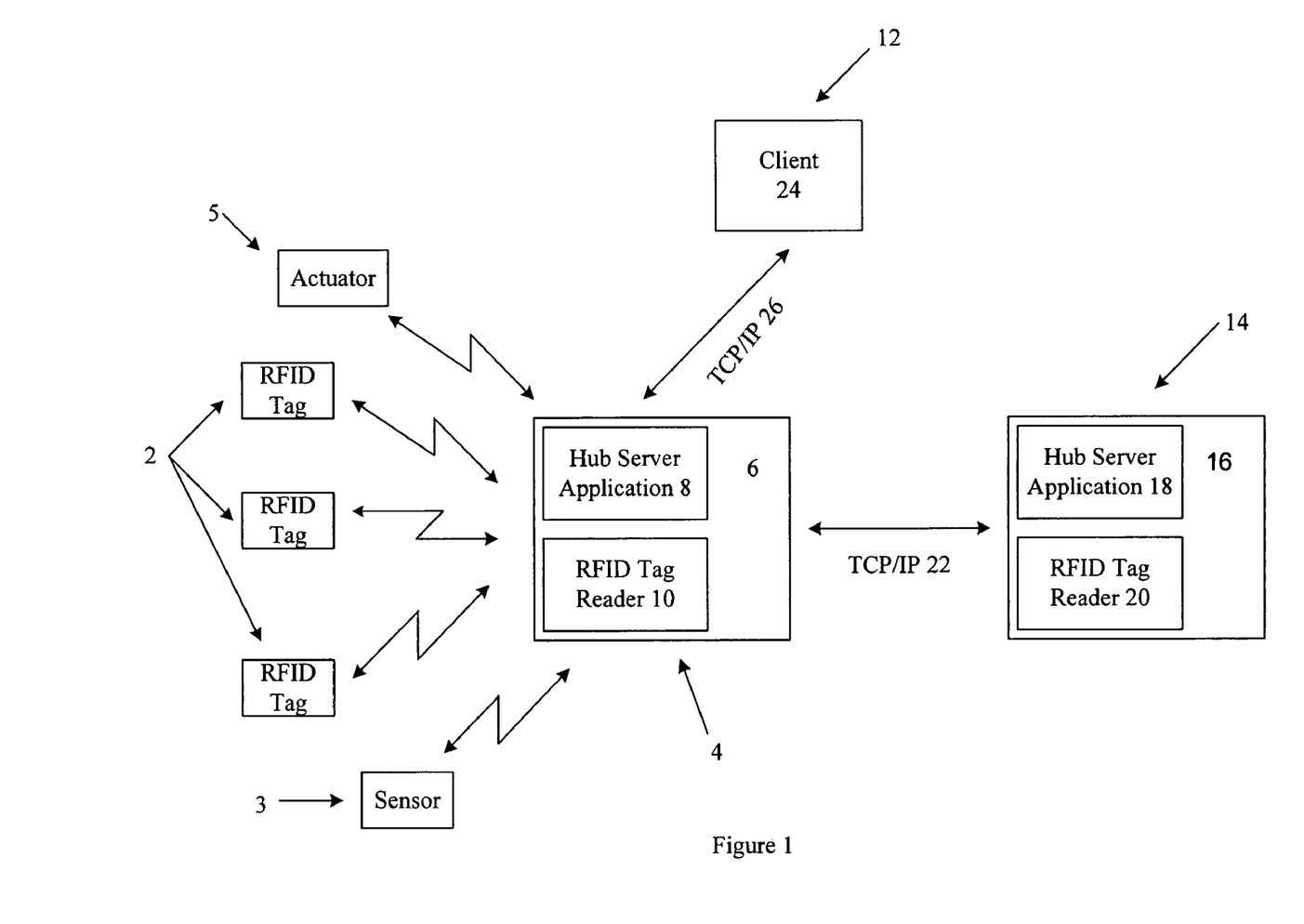
FIG. 1 illustrates an embodiment of a network on which the present invention operates.

FIG. 1 illustrates an embodiment of a network on which the present invention operates. The network includes RFID tags 2 containing data to be read by a network node 4. At network node 4 is a software hub server (SHS) 6. SHS 6 includes a hub server application 8 with data analysis and RFID tag data Java object encapsulation and forwarding functionality described in further detail below. SHS 6 further includes a RFID tag reader 10 for interrogating and receiving data from RFID tags 2. Where actuators 5 or sensors 3 are being utilized rather than or in addition to RFID tags, SHS 6 will include an actuator or sensor reader for receiving actuator or sensor data. RFID tags 2 store a variety of data based on the specific application. In an embodiment of the invention, RFID tags 2 may be read serially as they pass through a zone of coverage of RFID tag reader 20.

The network further includes a network node 14 with a software hub server (SHS) 16. SHS 16 includes a hub server application 18 and RFID tag reader 20. The network further includes a network node 12 including a client 24. Although FIG. 1 illustrates two software hub servers at network nodes, the present invention may utilize any number of software hub servers and network nodes or may comprise only a single software hub server collecting data from RFID tags. The network may further include any number of clients. Furthermore, any software hub server may gather data from RFID tags, actuators, or sensors.

In an embodiment of the invention, network node 4, network node 14, and client 24 are TCP/IP enabled devices and therefore addressable as network devices. The present invention utilizes a TCP/IP connection for delivery and management of RFID tag data, actuator data, or sensor data encapsulated Java objects. The network includes a TCP/IP connection 22 between network node 4 and network node 14 and a TCP/IP connection 26 between network node 4 and client 24. One of ordinary skill in the art will recognize that a TCP/IP channel can be established between any network node either directly or indirectly. Furthermore, TCP/IP connection 22 and TCP/IP connection 26 may be established using a wireless connection. Protocols for exchanging data via TCP/IP networks are well known and need not be discussed herein. The TCP/IP network could be the Internet or a private intranet. However, the present invention is not restricted to TCP/IP networks.

Client 24 is a computing device capable of running Java applications, such as a desktop personal computer, mobile handset, or personal digital assistant. Client 24 may operate on a variety of hardware and software platforms. The present invention allows the collected actuator, sensor or RFID tag data to be used on disparate hardware and software platforms through the use of Java objects. Client 24 includes a software application/service which receives and processes Java objects to utilize encapsulated data. Client 24 may archive received Java objects or perform further data analysis. In a further embodiment of the invention, client 24 may also run a hub server application. Each hub server application may activate Web services on the encapsulated data according to software hub server settings and installed Web services on the software hub server. In an embodiment of the invention, the hub server application reports all logged activities to a system administrator and report errors or danger conditions to the system administrator.

Figure 2:
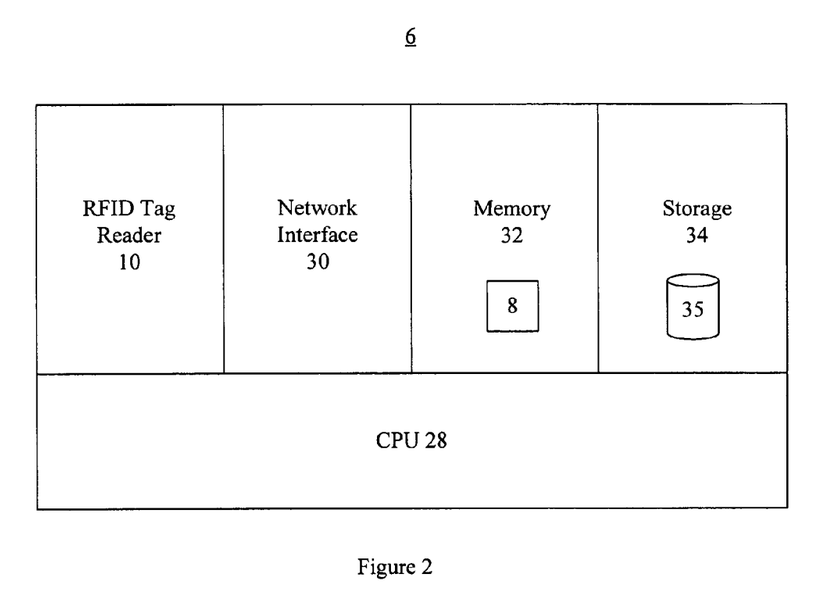
FIG. 2 illustrates an embodiment of the hardware architecture of an embodiment of the invention.

FIG. 2 is a simplified block diagram of a SHS 6 including hardware and software resources for receiving and processing RFID tag data in accordance with an embodiment of the present invention. SHS 6 includes a central processing unit (CPU) 28 interfacing with RFID tag reader 10, a network interface 30 for sending and receiving data to and from other network nodes or software hub servers, random access memory 32, and storage 34. CPU 28 processes information and instructions used by SHS 6. Memory 32 is any type of random access memory that can be used to store code and data for CPU 28. Hub server application 8 resides in memory 32 during operation. In a further embodiment, SHS 6 may include user interfaces such as user input/output devices and USB ports. Network interface 30 may include Ethernet, IEEE 802.11, or other suitable wired or wireless interface. SHS 6 can be a variety of computing devices, including devices such as servers, desktop computers, laptop computers, embedded systems, mobile handsets, or personal digital assistants. RFID tag reader 10 includes a transceiver for interrogating and receiving data from RFID tags using a variety of pre-determined protocols known in the art. Such protocols include Electronic Product Code (EPC) High Frequency (HF) and Ultra High Frequency (UHF). In an embodiment of the invention, RFID tag reader 10 is a multi-protocol reader capable of interrogating and receiving data using multiple protocols.

Storage 34 may include a hard drive, flash memory, CD-ROM, or other non-volatile storage mechanisms. Storage 34 may include a Java database 35 for storing logged events by hub server application 8. Java database 35 contains a log of events including RFID tag data Java objects created, received, forwarded, and transmitted by SHS 6. If a RFID tag data Java object is utilized by a background service/application residing on SHS 6, the object is consumed and the event is logged in Java database 35.

Figure 3:
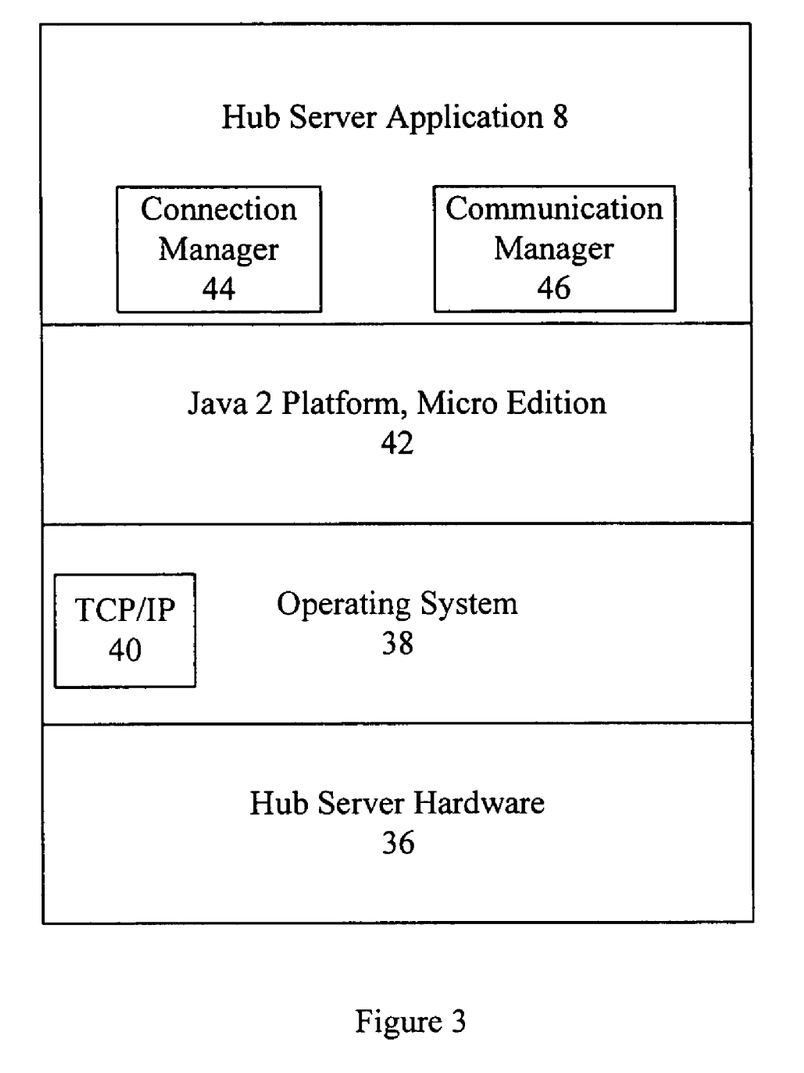
FIG. 3 illustrates an embodiment of the software architecture of an embodiment of the invention.

Referring to FIG. 3, the architecture of the software residing on SHS 6 in an embodiment of the invention is illustrated. At the lowest level of the diagram shown in FIG. 3 is hub server hardware 36 on which the software of the present invention is executed. Hardware 22 executes an operating system 38 which provides the basic functionality of the hub server platform. Operating system 38 is Linux in an embodiment of the invention, but other operating systems may be used in further embodiments. A hardware abstraction layer (not shown) comprises software drivers to control the various devices in hub server hardware 36. The particular operating system 38 selected should be as independent as possible from the hardware devices. Operating system 38 supports Transport Control Protocol/Internet Protocol (TCP/IP) 40. Each software hub server is therefore addressable as a network device.

Hub server hardware 36 executes Java 2 Platform, Micro Edition (J2ME) 42. Java 2 Platform, Micro Edition is an application environment specifically designed to address the needs for commodities in the consumer and embedded space, including mobile phones, pagers, and personal digital assistants. The Java 2 Platform, Micro Edition platform 42 is particularly suitable for smaller footprint devices that do not have the resources for a full Java platform or in which it would not be efficient to run a full Java platform. Java 2 Platform, Micro Edition 42 includes a subset of core Java application programming interfaces (APIs) and a set of APIs which are directed specifically to features required by these applications.

The Java 2 Platform, Micro Edition APIs provide a high-level, protocol-independent, common set of APIs for applications that are independent of underlying hardware platforms on which the applications are deployed. Java 2 Platform, Micro Edition 42 includes a Java virtual machine. In a further embodiment, Java 2 Platform Micro Edition and the Java virtual machine may be implemented separately. In an embodiment of the invention, Java 2 Platform, Micro Edition 42 utilizes the connected device configuration and foundation profile. Hub server application 8 uses Java 2 Platform, Micro Edition 42 APIs to create RFID tag data, actuator data or sensor data Java objects from the RFID tag data received from RFID tags 2, actuators 5 or sensors 3. The RFID tag data Java objects abstract data received from lower level protocols utilized by a variety of RFID tag systems. In an embodiment of the invention, hub server application 8 is configured to abstract data from one or more RFID tag systems, actuator systems, or sensor systems.

Hub server application created RFID tag data, actuator data, or sensor data Java objects are then processed and handled by Java-enabled devices. A Java object can be transmitted from one network node to another network node. The Java object format is useful because the Java objects can be serialized. The Java object can then be deserialized at the receiving network node to instantiate the same Java object on a different computer. Furthermore, Java objects can be broadcast across a network.

Hub server hardware 36 runs a Java virtual machine. The Java virtual machine is a software application that executes in the environment of the native operating system and provides a common environment for applications written in the Java programming language. The Java virtual machine is responsible for Java portability. Java virtual machine provides a layer of abstraction between the operating system 38 and an executable program, essentially providing a Java-to-operating system interface so that programs written in the Java programming language can be executed on a platform running an operating system which would not otherwise support execution of the program. Because Java virtual machines exist for many different platforms, the same Java language program can be executed on each of these different platforms. As a result, the remainder of the system is no longer tied to the original hardware, the original operating system, or the original supplier thereof.

The present invention utilizes hub server application 8 to create and manage Java objects from RFID tag data, actuator data, or sensor data. In an embodiment of the invention, hub server application 8 includes a connection manager 44 and a communication manager 46. Connection manager 44 interfaces with RFID tag reader to extract and receive data from the RFID tags read by RFID tag reader 10. Connection manager 44 monitors for any data read by RFID tag reader 10 and transfer RFID tag data to communication manager 46. Communication manager 46 encapsulates RFID tag data into RFID tag data Java objects and forwards RFID tag data Java objects to other network nodes. Communication manager 46 also assigns TimeToLive values and ToAddress values as described below. Hub server application 8 resides on top of Java 2 Platform Micro Edition 42. Although described using a connection manager 44 and a communication manager 46, one of ordinary skill in the art will recognize that hub server application 8 can utilize other configurations.

Hub server application 8 is a Java application designed to receive RFID tag data and create and manage Java objects. Hub server application 8 continuously runs and manages and controls the resources of SHS 6 to receive and process RFID tag data. Hub server application may include one or more lookup tables which correlate data extracted from RFID tag data and data to be inserted into a created RFID tag data Java object. In an embodiment of the invention, hub server application 8 is configured to receive sensor, actuator, and RFID tag data from multiple different protocols. Hub server application 8 may then simultaneously receive and process actuator, sensor and RFID tag data from isolated and non-compatible networks. As a result, one or more heterogeneous networks may operate as a homogeneous network of actuators, sensors and/or RFID tags. Abstraction of the received data into Java objects allows actuator, sensor and RFID tag data to be treated in a homogeneous manner in software.

Figure 4:
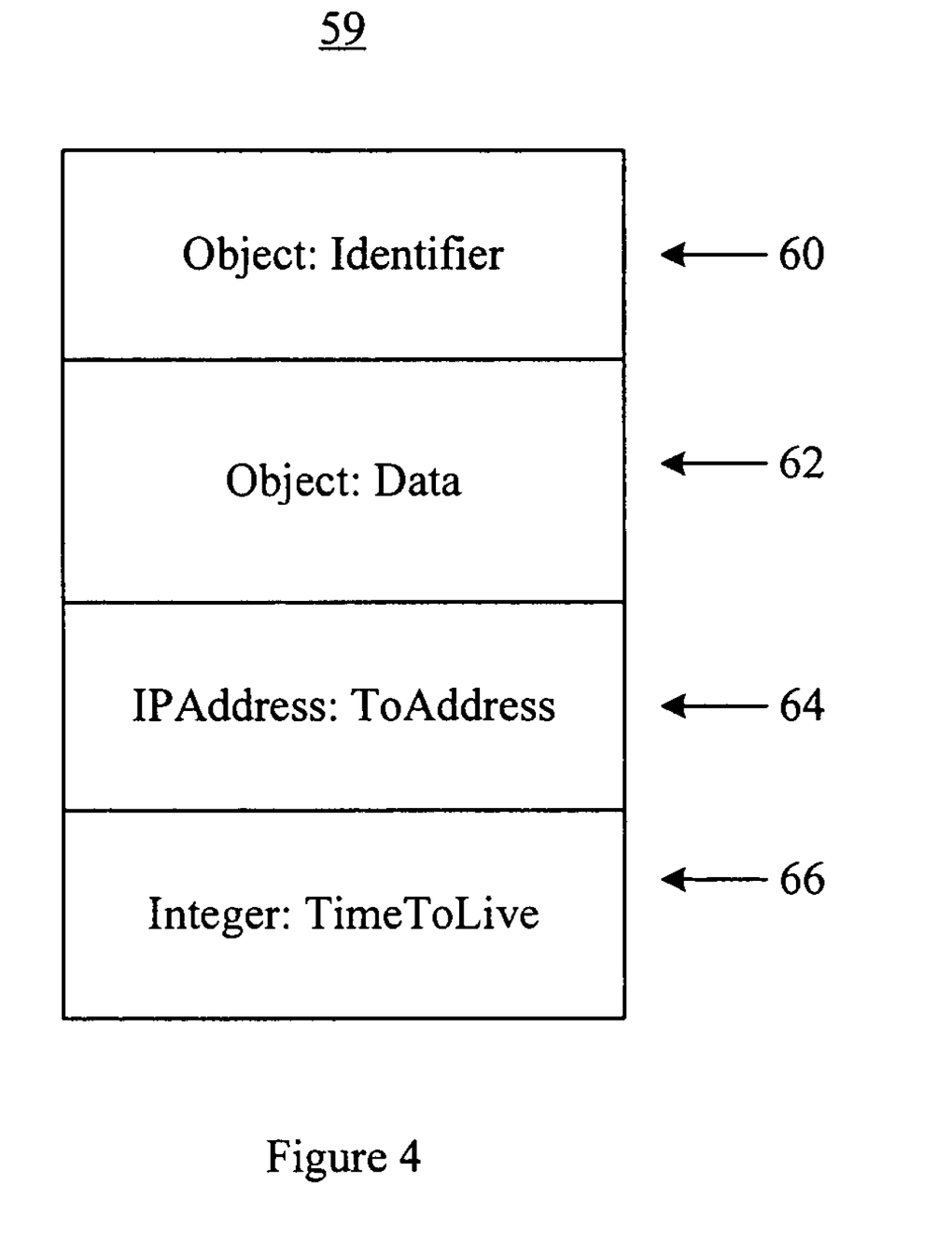
FIG. 4 illustrates an embodiment of a Java object utilized by the invention to store received data.

Referring to FIG. 4, an embodiment of a RFID tag data object 59 utilized by the invention to store received data is illustrated. RFID tag data objects 59 are instances of the RFID tag data class created by the hub server application 8. Each RFID tag data Java object 59 is created as an instance of the RFID tag data class by hub server application 8. The objects may therefore be said to have been instantiated from the class. The RFID tag data class sets out variables and methods for objects which belong to the class. The definition of the RFID tag data class does not itself create any RFID tag data Java objects 59. The RFID tag data class may define initial values for its variables, and it normally defines the methods associated with the class. The RFID tag data class may provide all of the program code which will be used by RFID tag data objects 59 in the class, hence maximizing re-use of code which is shared by objects in the class.

RFID tag data object 59 includes an identifier variable 60, data variable 62, ToAddress variable 64, and TimeToLive variable 66. ToAddress variable 64 receives an Internet Protocol (IP) address in an embodiment of the invention. Although RFID tag data object 59 has been described having an identifier variable 60 and data variable 62, one of ordinary skill in the art will recognize that data received from RFID tags, actuators, or sensors will vary based on the particular application and the RFID tag data class and resulting RFID tag data objects 59 will vary greatly based on the particular application at hand.

TimeToLive variable 66 receives an integer value. In an embodiment of the invention, the value assigned to TimeToLive variable 66 represents the lifespan of RFID tag data object 59 in terms of number of times sent from a hub server application at one network node to a hub server application at a different network node. Each time the RFID tag data Java object is transmitted to a different node on the network, the TimeToLive value is decremented by a value of one. Utilizing TimeToLive variable 66, the plurality of hub server applications ensure that a RFID tag data object 59 does not travel the network in an endless loop. The RFID tag data object 59 is deleted when the value of TimeToLive variable 66 reaches zero. In further embodiments, the TimeToLive value may be based on other criteria besides the number of times forwarded.

Figure 5:
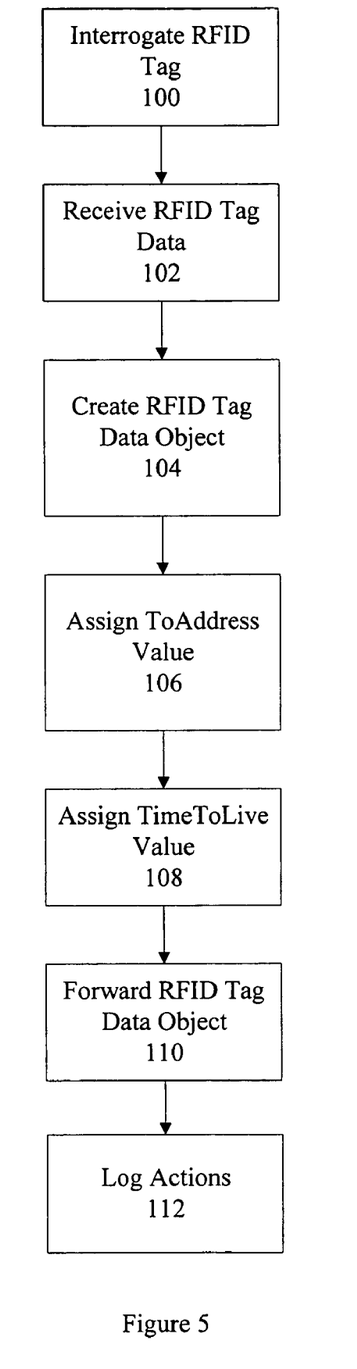
FIG. 5 is a flowchart illustrating the operation of the invention in one embodiment.

In operation, RFID tag data is converted to RFID tag data Java objects by hub server application 8. Referring to FIG. 5, a flowchart illustrating the operation of the invention in one embodiment is shown. Although described in reference to RFID tag data, the process described is applicable to actuator data and sensor data as well. At step 100, RFID tag reader 10 interrogates an RFID tag 2. At step 102, RFID tag data from RFID tag 2 is received by hub server application 8.

At step 104, hub server application creates Java object RFID tag data object 59 with variables including identifier variable 60, data variable 62, ToAddress variable 64, and TimeToLive variable 66. The variable fields and content of RFID tag data object 59 created will vary based on the particular application of the RFID tags and RFID tag data. In an embodiment of the invention, the RFID tag data is an ASCII string including a name or type identifier as well as associated data. Hub server application 8 algorithmically extracts the data from the text string and utilizes it to fill identifier variable 60 and data variable 62. Hub server application 8 may utilize a lookup table to perform pattern matching to correlate ASCII string data with information used to fill variables in RFID tag data object 59.

In a further embodiment of the invention, hub server application 8 executes an algorithm to analyze the data received from actuators, sensors or RFID tags. The algorithm determines if and when a Java object is created and the information the Java object will contain. Hub server application 8 may create a Java object only if the data meets certain conditions determined by the algorithm.

At step 106, hub server application 8 assigns a ToAddress value to ToAddress variable 64. In one embodiment of the invention, the ToAddress value may be determined using a ToAddress lookup table which correlates extracted RFID tag data with a ToAddress. In another embodiment, hub server application 8 may execute other algorithms to determine the ToAddress. The ToAddress value may be determined by other means as well. For example, the ToAddress value may be extracted from the RFID tag data.

At step 108, hub server application 8 assigns a TimeToLive value to TimeToLive variable 66. The TimeToLive value may be predetermined by a system manager. At step 10, hub server application 8 forwards the RFID tag data object based on the ToAddress. The RFID tag data object may be sent to one or more intermediary software hub servers prior to reaching the ToAddress destination. At step 112, hub server application 8 logs the actions performed in Java database 35. The RFID tag data object is utilized or processed (also referred to herein as "consumed") at the ToAddress destination.

Figure 6:
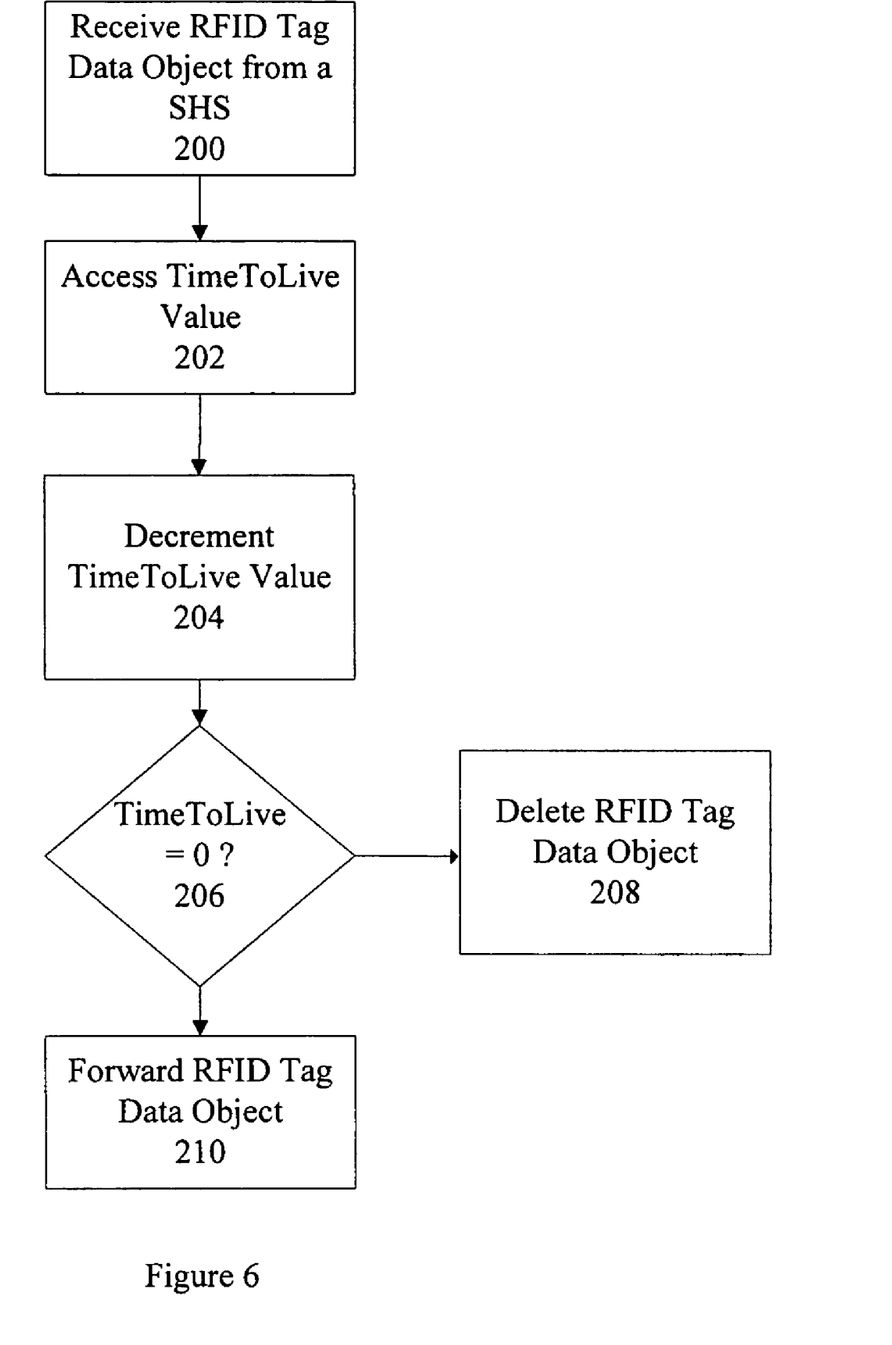
FIG. 6 is a flowchart illustrating the operation of the invention in a further embodiment.

Referring to FIG. 6, a flowchart illustrating the operation of a further aspect of the invention is shown. In operation, a software hub server located at a network node may receive a RFID tag data object for processing from a software hub server located at a different network node. In reference to FIGS. 1 and 6, at step 200, hub server application 18 at network node 14 receives a RFID tag data object from software hub server application 8 at network node 4 using TCP/IP connection 22. At step 202, hub server application 18 accesses the value of TimeToLive variable 66. At step 204, the TimeToLive value is decremented by a value of one. At step 206, the TimeToLive value is examined to determine if the value is equal to zero. If yes, at step 208 the RFID data Java object is deleted. If no, at step 210 the RFID data Java object is forwarded utilizing the value of ToAddress variable 64. The RFID tag data object may be sent to intermediary software hub servers prior to reaching its final ToAddress destination or until the TimeToLive value reaches zero. In a further embodiment of the invention, the RFID tag data object may be consumed at an intermediary software hub server prior to reaching the ToAddress or being deleted. Consumption may occur when a service running on an intermediary hub server processes a received RFID tag data object. The RFID tag data object is forwarded to intermediary servers until it reaches it's ToAddress, is consumed by a software hub server, or it is deleted when the TimeToLive value reaches zero.

Figure 7:
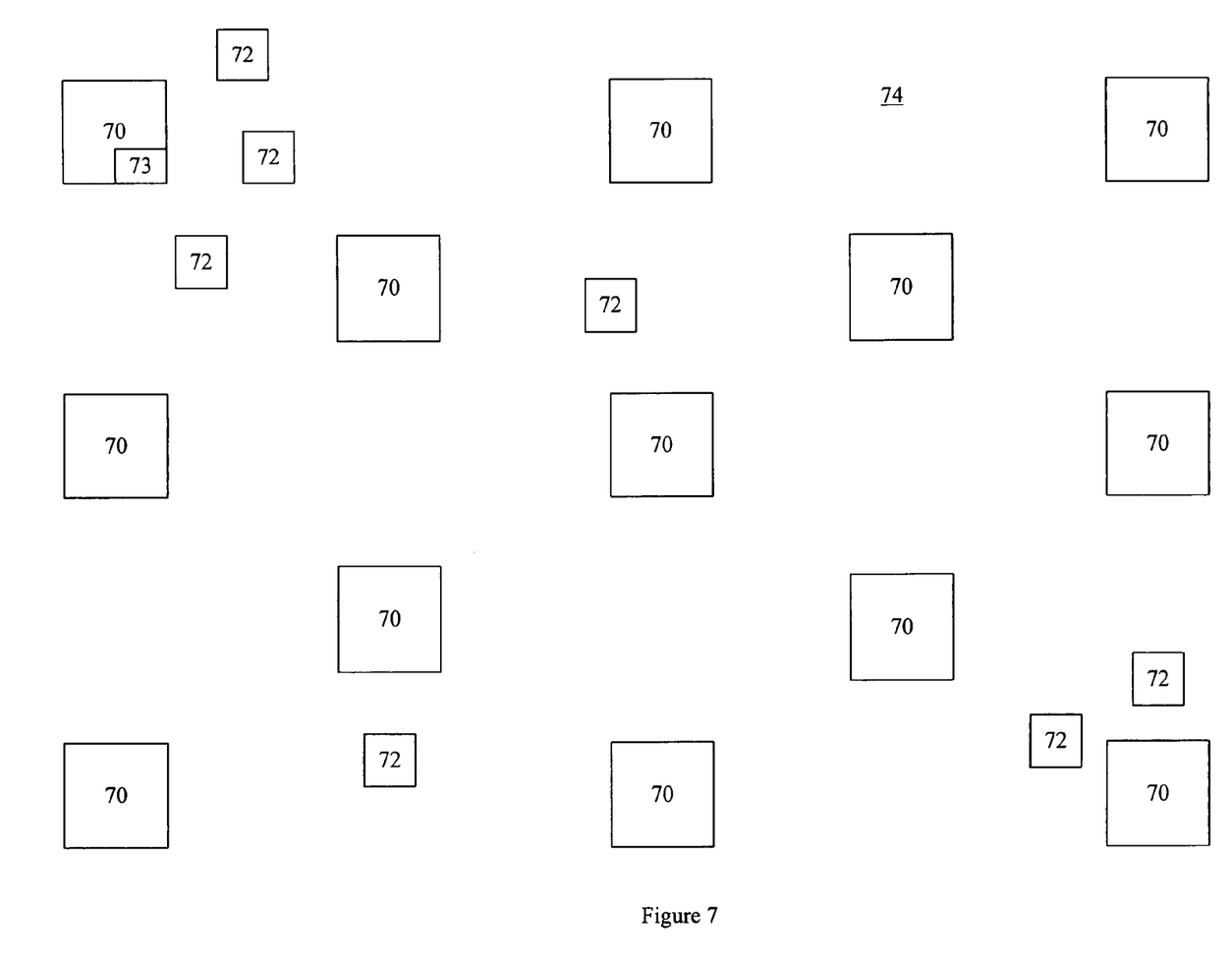
FIG. 7 illustrates a network on which the present invention operates in a further embodiment.

The present invention may be utilized in a network of a plurality of wireless software hub servers, with each software hub server having a hub server application with functionality described above. FIG. 7 illustrates a network on which the present invention operates in this further embodiment. In an embodiment of the invention, a plurality of wireless networking software hub servers 70 dispersed within a geographic region 74 collect data from dispersed RFID tags 72 dispersed. Each wireless networking software hub server 70 interrogates and receives data from RFID tags 72 in its limited proximate geographic location. RFID tag data received at each software hub server 70 is processed as described above to encapsulate the RFID tag data and assign a destination ToAddress. In an embodiment of the invention, each RFID tag data object is forwarded between wireless software hub servers in the direction of the ToAddress. The RFID tag data object is forwarded until it reaches the ToAddress or the TimeToLive value reaches zero. In this manner, system failures or other problems resulting from RFID tag data objects being forwarded in an endless loop are prevented.

In a further embodiment of the network illustrated in FIG. 7, each wireless software hub server includes one or more integrated sensors or actuators 73 which provide sensor or actuator data to the hub server application. Due to the limited transceiver range of each software hub server, encapsulated sensor or actuator data Java objects are forwarded to intermediary software hub servers before reaching a final ToAddress destination. In an embodiment of the invention, the wireless software hub servers with integrated sensors or actuators may be dispersed widely as "intelligent dust" or "intelligent agents" throughout a mesh.

Having described the invention in terms of a preferred embodiment, it will be recognized by those skilled in the art that various types of components may be substituted for the configuration described above to achieve an equivalent result. It will be apparent to those skilled in the art that modifications and variations of the described embodiments are possible, and that other elements or methods may be used to perform equivalent functions, all of which fall within the true spirit and scope of the invention as measured by the following claims.

The invention claimed is:

1. A method for processing actuator, sensor or radio frequency identification (RFID) tag data comprising:
   receiving actuator, sensor or RFID tag data;
   generating an object of an object-oriented programming environment associated with the actuator, sensor or RFID tag data;
   wherein generating an object within an object-oriented programming environment involves explicitly creating the object as an instance of the class of the received data, and wherein the object includes an assigned destination address; and
   forwarding the object to the assigned destination address.

2. The method of claim 1, wherein the object is a Java object.

3. The method of claim 1, wherein generating an object associated with the actuator, sensor or RFID tag data comprises assigning a time to live value to the object.

4. The method of claim 1, wherein the destination address is an Internet Protocol address.

5. The method of claim 1, wherein forwarding the object to the assigned destination address comprises initiating a TCP/IP connection.

6. The method of claim 1 wherein receiving actuator, sensor or RFID tag data comprises:
   receiving RF signals from an RFID tag at a network node; and
   decoding the RFID tag data in the RF signals to obtain RFID tag data.

7. The method of claim 1, wherein the RFID tag data is received using Electronic Product Code High Frequency or Ultra High Frequency protocol.

8. The method of claim 1, wherein the actuator, sensor or RFID tag data is received using multiple protocols.

9. The method of claim 1, wherein generating an object associated with the actuator, sensor or RFID tag data comprises encapsulating the actuator, sensor or RFID tag data in the object.

10. The method of claim 1, wherein generating an object associated with the actuator, sensor or RFID tag data comprises analyzing the actuator, sensor or RFID tag data.

11. The method of claim 10, wherein analyzing the actuator, sensor or RFID tag data comprises using a lookup table to obtain an actuator, sensor or RFID tag data correlation.

12. The method of claim 1, further comprising logging events associated with the object creation and forwarding.

13. The method of claim 1, wherein the object is generated in a Java 2 Platform Micro Edition application environment.

14. The method of claim 1, further comprising broadcasting the object across a network.

15. The method of claim 1, wherein the assigned destination address is obtained from a lookup table.

16. The method of claim 1, further comprising forwarding the object to an intermediary address.

17. A computer readable storage medium storing instructions that when executed by a computer cause the computer to perform a method for processing actuator, sensor or radio frequency identification (RFID) tag data, comprising:
   receiving actuator, sensor or RFID tag data;
   generating a Java object associated with the actuator, sensor or RFID tag data;
   wherein generating a Java object involves explicitly creating the object as an instance of the class of the received data, and wherein the Java object includes an assigned destination address; and
   forwarding the Java object to the assigned destination address.

18. The computer readable storage medium of claim 17, wherein generating a Java object associated with the actuator, sensor or RFID tag data comprises assigning a time to live value to the Java object.

19. The computer readable storage medium of claim 17, wherein the destination address is an Internet Protocol address.

20. The computer readable storage medium of claim 17, wherein forwarding the Java object to the assigned destination address comprises initiating a TCP/IP connection.

21. The computer readable storage medium of claim 17, wherein receiving actuator, sensor or RFID tag data comprises:
   receiving RF signals from an RFID tag at a network node; and
   decoding the RFID tag data in the RF signals to obtain RFID tag data.

22. The computer readable storage medium of claim 17, wherein the RFID tag data is received using Electronic Product Code High Frequency or Ultra High Frequency protocol.

23. The computer readable storage medium of claim 17, wherein the actuator, sensor or RFID tag data is received using multiple protocols.

24. The computer readable storage medium of claim 17, wherein generating a Java object associated with the actuator, sensor or RFID tag data comprises encapsulating the actuator, sensor or RFID tag data in the Java object.

25. The computer readable storage medium of claim 17, wherein generating a Java object associated with the actuator, sensor or RFID tag data comprises analyzing the actuator, sensor or RFID tag data.

26. The computer readable storage medium of claim 25, wherein analyzing the actuator, sensor or RFID tag data comprises using a lookup table to obtain a actuator, sensor or RFID tag data correlation.

27. The computer readable storage medium of claim 17, wherein the method further comprises logging events associated with the Java object creation and forwarding.

28. The computer readable storage medium of claim 17, wherein the Java object is generated in a Java 2 Platform Micro Edition application environment.

29. The computer readable storage medium of claim 17, wherein the method further comprises broadcasting the Java object across a network.

30. The computer readable storage medium of claim 17, wherein the assigned destination address is obtained from a lookup table.

31. The computer readable storage medium of claim 17, wherein the method further comprises forwarding the Java object to an intermediary address.

32. An apparatus for processing actuator, sensor or radio frequency identification (RFID) tag data comprising:
   a receiving mechanism for receiving actuator, sensor or RFID tag data;
   an object creation mechanism for generating a Java object associated with the actuator, sensor or RFID tag data;
   wherein generating a Java object involves explicitly creating the object as an instance of the class of the received data, and wherein the Java object includes an assigned destination address; and a communication mechanism for forwarding the Java object to the assigned destination address.

33. The apparatus of claim 32, wherein the destination address is an Internet Protocol address.

34. The apparatus of claim 32, further comprising a logging mechanism for logging events associated with the Java object creation and forwarding.

35. The apparatus of claim 32, wherein the assigned destination address is obtained from a lookup table.

* * * * *